United States Patent
Stone

(10) Patent No.: US 7,018,195 B2
(45) Date of Patent: Mar. 28, 2006

(54) DEVICE AND METHOD FOR FLARING TUBING

(76) Inventor: Richard Lee Stone, 3689 Forest St., Oscoda, MI (US) 48750

(*) Notice: Subject to any disclaimer, the term of this patent is extended or adjusted under 35 U.S.C. 154(b) by 190 days.

(21) Appl. No.: 10/310,359

(22) Filed: Dec. 4, 2002

(65) Prior Publication Data
US 2004/0109912 A1    Jun. 10, 2004

(51) Int. Cl.
*B29C 53/08* (2006.01)
(52) U.S. Cl. ............... 425/392; 425/393; 249/114.1
(58) Field of Classification Search ........ 425/392–393; 249/114.1, 115–116
See application file for complete search history.

(56) References Cited

U.S. PATENT DOCUMENTS

| | | | |
|---|---|---|---|
| 3,749,543 A * | 7/1973 | Stansbury ............ 425/393 |
| 4,404,159 A * | 9/1983 | McFarlane ............ 425/393 |
| 4,450,618 A | 5/1984 | Ridenour | |
| 4,687,432 A * | 8/1987 | Cross et al. ............ 425/392 |
| 4,750,525 A | 6/1988 | Vaughan | |
| 4,969,972 A * | 11/1990 | Kunz ............ 264/248 |
| 5,744,085 A * | 4/1998 | Sorberg ............ 425/393 |
| 6,153,132 A | 11/2000 | Chapman et al. | |
| 6,660,199 B1 * | 12/2003 | Siferd et al. ............ 264/150 |

FOREIGN PATENT DOCUMENTS

JP           62-290666       * 12/1987

* cited by examiner

*Primary Examiner*—Duane Smith
*Assistant Examiner*—Thu Khanh T. Nguyen
(74) *Attorney, Agent, or Firm*—Irving M. Weiner; Pamela S. Burt; Weiner & Burt, P.C.

(57) ABSTRACT

A device or method for flaring nylon or plastic tubings while on a tube-bending fixture, without the necessity of flaring in the assembly process so the tube can be inserted with a coupler or connector. A first embodiment includes a tapered post having a bi-metallic spring mounted thereon. A second embodiment includes a tapered movable piston for forming the flare in the tube.

2 Claims, 1 Drawing Sheet

DEVICE AND METHOD FOR FLARING TUBING

The present invention relates generally to a device and a method for flaring tubing.

More particularly, the present invention relates to a device and method for the flaring of nylon or plastic tubing while on a tube-bending fixture, thus eliminating the need to flare the tube during an assembly process so the tube can be inserted with a coupler or connector.

BACKGROUND OF THE INVENTION

Heretofore, various devices and techniques have been employed for flaring tubing.

Ridenour U.S. Pat. No. 4,450,618, entitled "TUBE FITTING ASSEMBLY METHOD WITH DEFORMABLE SEAL", discloses a tube fitting assembly wherein a ductile metal tube is forced into first and second orifices within a fitting.

Vaughan U.S. Pat. No. 4,750,525, entitled "END CLOSURE FOR FLEXIBLE PLASTIC TUBES", discloses a technique wherein the ends of flexible plastic tubes, particularly of relatively thin thickness, are closed with a cylindrical header or end plug over which an end of the plastic tube is fitted.

Chapman et al. U.S. Pat. No. 6,153,132, entitled "CONTROL METHOD FOR THE MANUFACTURE OF ORIENTED PLASTIC TUBES", discloses a method of expanding a tube of plastics material in which a longitudinally traveling tube is progressively diametrically expanded in internal fluid pressure in an expansion zone between an upstream plug and an expandable downstream plug.

It is a desideratum of the present invention to provide a novel and unique device and method of flaring nylon or plastic tubes, while avoiding the animadversions of the conventional devices and techniques.

SUMMARY OF THE INVENTION

The present invention provides a device for flaring a tube, comprising a body member; a tapered member for insertion into said tube; and said body member being operably connected with said tapered member and from which said tapered member extends.

The present invention also provides a device for flaring a tube, comprising: a main body member; said main body member including a hollow cylindrical portion; a movable piston within said hollow cylindrical portion of said main body member; a mounting bracket connected to or forming part of said main body member; a cap member securable to said main body member for keeping said piston in said main body member and stopping the movement of said piston, while permitting said flare to be formed on said tube.

It is an object of the present invention to flare nylon or plastic tubing while on a tube-bending fixture.

It is a further object of the present invention to provide a device and method which eliminates the need to flare the tubing during an assembly process so that the tube can be inserted with a coupler or connector.

It is a further object of the present invention to provide a first embodiment which utilizes a bi-metal spring end stop.

It is yet another object of the present invention to provide another embodiment wherein a piston end stop is employed for producing the flare.

Further objects, advantages and features of the present invention will become apparent to those persons skilled in this particular area of technology, and to others, after having been exposed to the detailed description set forth herein below in conjunction with the accompanying drawings.

DETAILED DESCRIPTION OF SOME PREFERRED EMBODIMENTS

A first preferred embodiment of the present invention will now be described herein below with reference to FIGS. 1 and 2.

Figure 1:
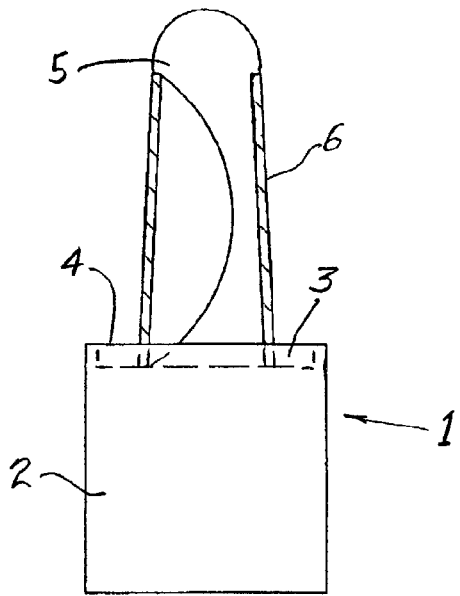
FIG. 1 is an elevational view which illustrates a first preferred embodiment of the present invention.

FIG. 1 shows the device 1 for flaring a tube (not shown), with the device 1 comprising a main body member 2 having a cylindrical cavity 3 formed at one end 4 thereof. Extending from the cylindrical cavity 3 is a tapered member 5 for insertion into the tube to be flared.

Preferably, but not necessarily, the main body member 2 can be fabricated from a high grade of aluminum, or cast or machined out of any suitable metal stock.

Figure 2:
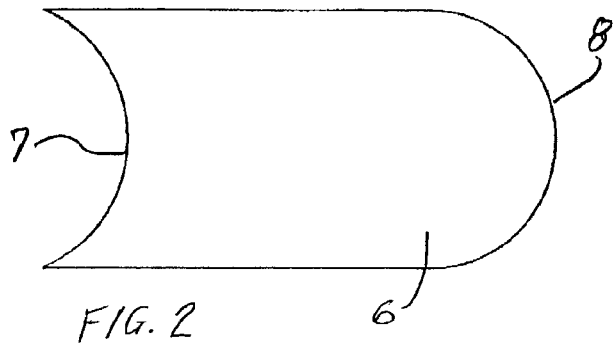
FIG. 2 depicts the flat bi-metal spring component of the FIG. 1 embodiment.

FIG. 2 shows a substantially flat bi-metal spring member 6. The spring member 6 is fabricated, preferably, but not necessarily, with two curved end portions 7 and 8.

FIG. 1 shows the spring member 6 wound on the tapered post or member 5, with the spring member 6 extending below the furthermost exterior surface 4 of the main body member 2. The bi-metal spring member 6 is placed on the tapered post or member 5 so as not to cause any unwanted weak spots in the tube wall of the tube to be flared. The spring member 6 extends beneath the furthermost external surface 4 of the main body member 2 to avoid getting the tube curled over the end.

All components of the device 1 are coated with a non-stick coating, such as a Teflon® coating, to help loading, unloading and reducing wear. Such a non-stick coating, such as Teflon® coating also prevents the tube from sticking to the various components.

A second preferred embodiment of the present invention is illustrated and described hereinbelow with reference to FIGS. 3 and 4.

Figure 3:
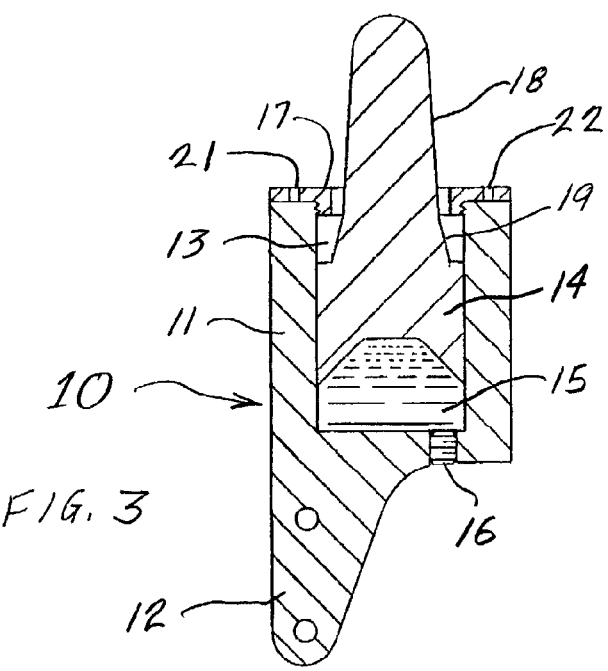
FIG. 3 is an elevational view illustrating a second preferred embodiment of the present invention.
Figure 4:
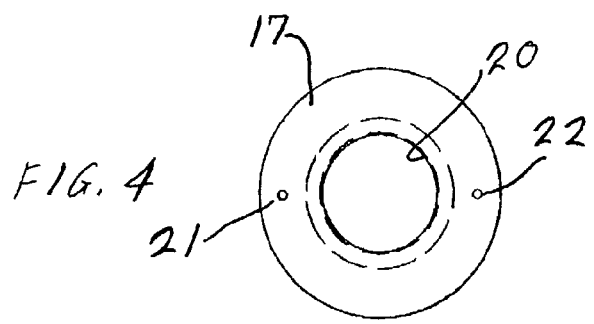
FIG. 4 depicts a top plan view of the stop ring component of the FIG. 3 embodiment.

The flaring device 10 shown in FIGS. 3 and 4 includes a main body member 11 provided with a mounting bracket portion 12. The main body member 11 is provided with a cylindrical opening 13 therein.

A moveable piston 14 is fitted within the cylindrical opening 13 of the main body member 11. Between the piston 14 and the main body member 11 there is formed an air or fluid pocket 15. In the area of such fluid pocket 15 in the main body member 11 there is provided a metering screw 16 to facilitate assembly and to provide a way to adjust the piston 14.

A cap member 17 in the form of a stop ring is threadably secured to the body member 11 to hold the piston 14 within the body member 11, and to limit the upward movement of the piston 14.

It should be noted that the piston 14 is provided with a slight taper in the piston shaft 18. The piston 14 is provided with a flare-angled shoulder 19 which comes into contact with the tube in order to flare the end of the tube.

The stop ring 17 allows the piston 14 to travel without coming out of the body member. The internal aperture 20 in the stop ring 17 is just a fraction smaller than the internal diameter of the bore of the cylinder 13.

The stop ring 17 is provided with a pair of diametrically-opposed holes 21 and 22 for accommodating a wrench (not shown) for threading the stop ring 17 onto the main body member 11.

As with the first embodiment described above, all components of the second embodiment are also coated with a non-stick coating, such as a Teflon® coating, to assist in loading, unloading and reducing wear, and to prevent sticking of the tube to the components.

Both of the above-described embodiments of the present invention permit the flaring of nylon or plastic tubing while on a tube-bending fixture, without the need to flare the tube during an assembly process so the tube can be inserted with a coupler or a connector.

Heat from associated ovens will cause movement to flare the tube. When the fixture device 1 or 10 is cooled in a dip tank or a cold water spray, it will deactivate and the tubes can be removed and the fixture device 1 or 10 reloaded.

All portions of the end stop devices 1 and 10 should be coated with a non-stick coating, such as a Teflon® coating, to help in loading, unloading, and to assist in increasing wear performance.

Preferably, but not necessarily, the spring member should be fabricated from heavy duty metallic material.

Preferably, but not necessarily, the stops should be fabricated of aluminum or stainless steel.

Also, any necessary steel should be of industrial grade.

It is to be understood that the foregoing description is for purposes of illustration only, and not for limitation.

It should further be understood that various modifications, variations, and changes will acer to those persons skilled in this area of technology and to others after having been exposed to the present patent application.

All such modifications, changes, and variations are intended to be embraced within the scope of the present invention as set forth in the claims hereinbelow.

What is claimed is:

1. A device for flaring a tube, comprising:

a main body member;

a tapered member for insertion into a tube;

said tapered member comprising a tapered post, which is integral with said main body member;

said main body member being unitary with said tapered post and from which said main body member said tapered post extends;

a substantially flat bi-metal spring member wound around said tapered member;

said substantially flat bi-metal spring member is provided with at last one curved end portion;

said main body member, said tapered member, and said substantially flat bi-metal spring member are coated with a non-stick coating;

said main body member includes a concave cylindrical portion;

said main body member includes a first predetermined surface which is coplanar with one base of said concave cylindrical portion;

said main body member includes a second predetermined surface which is parallel to said first predetermined surface and which is coplanar with another base of said concave cylindrical portion;

said tapered member extends from said second predetermined surface of said main body member; and said substantially flat bi-metal spring member extends from said predetermined surface and traverses the plane of said first predetermined surface.

2. A device for flaring a tube, comprising:

a main body member;

said main body member including a hollow cylindrical portion;

a movable piston within said hollow cylindrical portion of said main body member;

a mounting bracket forming part of said body member;

a cap member securable to said body member for keeping said movable piston in said main body member and for stopping the movement of said movable piston, while permitting said flare to be formed on said tube;

said movable piston is provided with a tapered shoulder to be pushed into said tube to be flared;

said cap member comprises a stop ring which will allow said movable piston to travel without coming out of said body member;

said stop ring having an inner diameter which is slightly smaller than the inner diameter of said hollow cylindrical portion of said body member;

said stop ring and said main body member are provided with threads which permit said stop ring to be threaded into said main body member to hold said movable piston therein, while allowing said movable piston to travel back and forth within said main body member;

said piston comprises a base and a tapered portion extending from said base;

said base is provided with a shoulder thereon;

an air or fluid pocket is formed between said main body member and said movable piston;

there is provided in said main body member in the vicinity of said air or fluid pocket a metering screw to facilitate assembly of said device and to provide a way to adjust said movable piston within said body member; and said stop ring is provided with a pair of diametrically-opposed holes for accommodating a wrench to facilitate threading said stop ring onto said main body member.

* * * * *